United States Patent [19]

Saito et al.

[11] Patent Number: 4,491,032
[45] Date of Patent: Jan. 1, 1985

[54] GEAR SHIFT CONTROL LINKAGE OF TRANSMISSION

[75] Inventors: Yoshihiro Saito, Yokohama; Komei Yazaki, Atsugi, both of Japan

[73] Assignee: Nissan Motor Company, Limited, Yokohama, Japan

[21] Appl. No.: 411,848

[22] Filed: Aug. 26, 1982

[30] Foreign Application Priority Data

Oct. 12, 1981 [JP] Japan .................. 56-162342

[51] Int. Cl.³ ..................... G05G 9/18; G05G 7/16
[52] U.S. Cl. ..................... 74/473 R; 74/491
[58] Field of Search .............. 74/473 R, 491, 523

[56] References Cited

U.S. PATENT DOCUMENTS

| | | | |
|---|---|---|---|
| 2,040,594 | 5/1936 | Bixby | 74/473 |
| 2,390,711 | 12/1945 | Holmstrom | 74/473 |
| 2,399,613 | 5/1946 | Backus | 74/473 |
| 2,819,626 | 1/1958 | Stump | 74/473 |
| 3,489,028 | 1/1970 | Blavette | 74/473 |
| 3,899,934 | 8/1975 | Froumajou | 74/473 R X |
| 4,050,325 | 9/1977 | Shishido | 74/473 R |
| 4,086,822 | 5/1978 | Kuroda | 74/473 R |
| 4,364,450 | 12/1982 | Kemp | 74/473 R X |

FOREIGN PATENT DOCUMENTS

| | | |
|---|---|---|
| 1478 | 4/1979 | European Pat. Off. . |
| 6330 | 1/1980 | European Pat. Off. . |
| 2641694 | 5/1977 | Fed. Rep. of Germany .... 74/473 R |
| 1394157 | 2/1965 | France . |
| 2181112 | 11/1973 | France . |
| 1182766 | 3/1970 | United Kingdom . |
| 1390886 | 4/1975 | United Kingdom . |
| 1402662 | 8/1975 | United Kingdom ............. 74/473 R |
| 1567081 | 5/1980 | United Kingdom . |

*Primary Examiner*—Allan D. Herrmann
*Attorney, Agent, or Firm*—Lane, Aitken & Kananen

[57] ABSTRACT

A transmission is connected with a manually operable control or shift lever by a control rod which transmits a driver's manual movement to the transmission. In order to prevent a resonance of the control rod from being caused by vibration of the engine, the control rod is divided into two parts which are connected end to end by a joint. There is further provided a support rod which supports the control lever and the control rod. The support rod extends substantially in parallel with the control rod, and both of its ends are connected, respectively, to a vehicle body or a housing of the transmission. The support rod has bearing means for swingably supporting the control lever and an arm which supports the control rod, at the either one of its two parts, rotatably and axially slidably.

11 Claims, 6 Drawing Figures

GEAR SHIFT CONTROL LINKAGE OF TRANSMISSION

BACKGROUND OF THE INVENTION

The present invention relates to a gear shift control linkage system for a vehicular transmission.

In a transmission system there is provided a linkage for transmitting a manual movement of a control or shift lever to the transmission to accomplish a speed change. However, such a linkage also serves to transmit vibrations of the engine reversely from the transmission to the control lever and to the body of the vehicle. If a resonance is caused in the linkage by a vibration of the engine, the vibration is amplified an exerts a more harmful influence.

SUMMARY OF THE INVENTION

It is an object of the present invention to provide a gear shift control linkage system of a vehicular transmission which is arranged to restrict vibrations transmitted from the engine to a control lever and a body of the vehicle.

It is another object of the present invention to provide a gear shift control linkage system of a vehicular transmission which is arranged not to be excited to a resonance by vibrations of the engine.

According to the present invention, a gear shift control linkage system comprises a manually operable gear shift control lever which is swingable on a fulcrum intermediate between an upper end and a lower end, support means which supports the control lever and has pivot bearing means for allowing the control lever to swing on the fulcrum, and a control rod pivotally connected at one end with the lower end of the control lever and pivotally connected at the other end with a control shaft of the transmission for transmitting a movement of the control lever to the transmission to effect a speed change. The control rod comprises two parts, a first half rod on the control lever side and a second half rod on the transmission side which are connected together end to end by a joint. The control rod is supported rotatably and axially slidably at an intermediate portion between both ends by an arm formed in the support means.

Preferably, the support means comprises a support rod which extends substantially in parallel with the control rod and fixedly supports the pivot bearing means. One end of the support rod is connected to a body of the vehicle, and the other end is connected to a housing of the transmission or the body of the vehicle.

The arm of the support menas is integral with the support rod and has at an end slide bearing means which supports one of the first half rod and the second half rod in such a manner that the supported one is axially slidable and rotatable on its own axis.

In some cases, the support rod also comprises two parts, a first half support rod on the control lever side and a second half support rod on the transmission side which are connected together end to end by a joint.

DETAILED DESCRIPTION OF THE INVENTION

Figure 1:
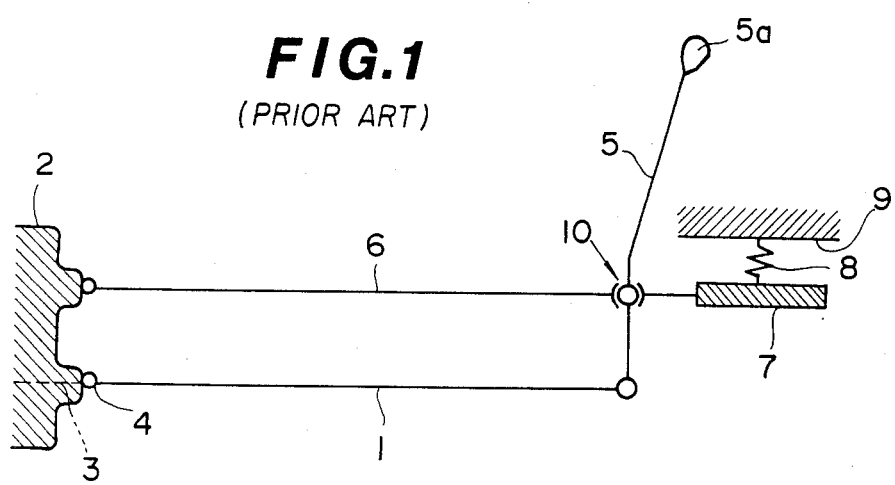
FIG. 1 is a schematic view of a conventional control linkage system for a transmission.

To facilitate understanding the present invention, a brief reference will be made to an example of a conventional control linkage system for a transmission, depicted in FIG. 1. In FIG. 1, a control rod 1 is connected, at one end through a universal joint 4, with a striking rod 3 which extends into a transmission 2 connected with an engine (not shown). The control rod 1 extends rearward of the transmission 2 and is connected at the other end rotatably with a lower portion of a control or shift lever 5.

A support rod 6 is pivotally connected at one end through a pin (not shown) with the transmission 2. The support rod 6 extends rearward substantially in parallel with the control rod 1 and is fixed to a bracket 7 which is connected with a vehicle body member 9 through an elastic member 8. The support rod 6 swingably supports the control lever 5 through a spherical bearing 10. Thus, the control lever 5 is swingable in the fore and aft direction (right and left in FIG. 1) and in the right and left direction (perpendicular to the plane of the paper in FIG. 1).

When a knob 5a on the top end of the control lever 5 is moved right and left, the control lever 5 swings right and left on the spherical bearing 10, which causes the control rod 1 to rotate to effect a so-called select operation. When the know 5a is then moved fore and aft, the control lever 5 swings fore and aft on the spherical bearing 10, which causes the control rod 1 to move axially to effect a so-called shift operation. Thus, a gear change is accomplished in the transmission 2.

In this control linkage system for a transmission, the length of the control rod 1 is determined by the relation of the positions of the transmission 2 and the control lever 5. Therefore, it is difficult to avoid a resonance of the control rod 1 which occurs when the frequency of a vibration caused by the engine revolution coincides with the natural frequency of the control rod 1. Such a resonance amplifies the vibration of the engine, which is then transmitted through the control rod 1 not only to the control lever but also to the vehicle body via the support portion of the control rod 1.

Figure 2:
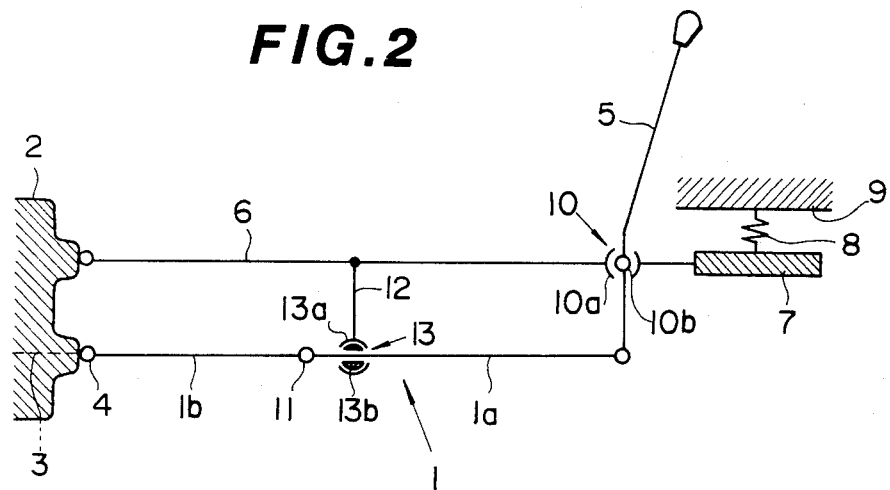
FIG. 2 is a schematic view showing one embodiment of the present invention.
Figure 3:
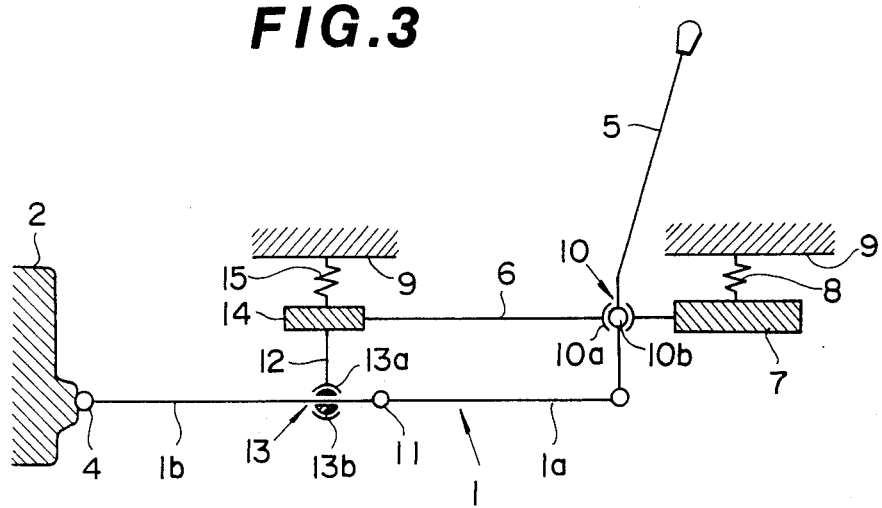
FIG. 3 is a schematic view showing a second embodiment of the present invention.
Figure 4:
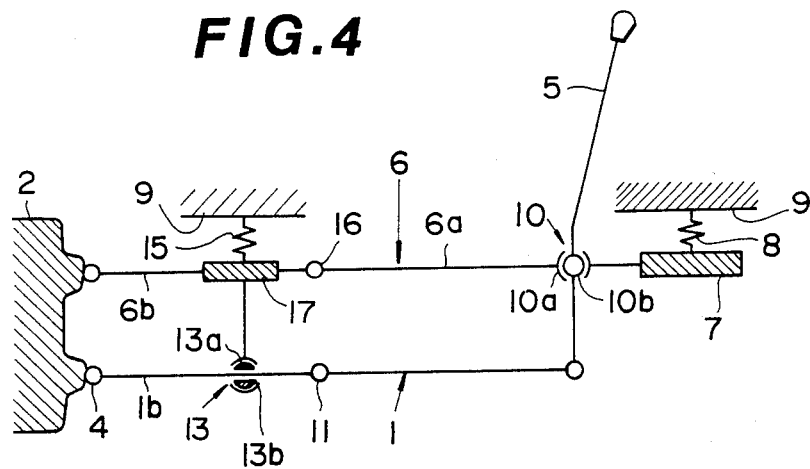
FIG. 4 is a schematic view showing a third embodiment of the present invention.

In view of the above description, a reference is now made to embodiments of the present invention shown in FIGS. 2-4.

In FIG. 2, a control rod 1 is divided into two parts, a first part 1a on the control lever side and a second part 1b on the transmission side, and these two parts 1a and 1b are connected together by a universal joint 11. This control rod 1 is connected at one end with a striking rod 3 of a transmission 2 through a universal joint 4. The control rod 1 extends rearward of the transmission 2, and the other end of the control rod 1 is rotatably connected with a lower portion of a control lever 5, as in the case of FIG. 1.

One end of a support rod 6 is swingably connected with the transmission 2 by a pin. The support rod 6 extends substantially in parallel with the control rod 1 and is fixed at the other end with a bracket 7 which is connected with a vehicle body 9 through an elastic member 8. The support rod 6 swingably supports the control lever 5 through a spherical bearing 10. Thus, the control lever 5 is swingable in the fore and aft or shift direction (right and left in FIG. 2) and in the right and left or select direction (normal to the plane of the paper in FIG. 2). The spherical bearing 10 comprises a spherical seat 10a formed in the support rod 6 and a ball portion 10b which is formed in the control rod 5 and confined in the spherical seat 10a.

The supprt rod 6 is integrally formed with an arm 12 extending toward the control rod 1. This arm 12 of the support rod 6 has at an end a support portion 13 which supports the first part 1a of the control rod 1. The support portion 13 of the arm 12 comprises a spherical seat 13a, and a ball member 13b confined in the spherical seat 13a. The ball member 13b has a hole extending from one side to the opposite side through the center of the ball member. The first part 1a of the control rod 1 extends through the hole of the ball member 13b. Thus, the first part 1a is axially movable by sliding along the inner surface of the hole of the ball member 13b, and rotatable by the aid of the spherical contact between the spherical seat 13a and the ball member 13b and the cylindrical surface contact between the first part 1a of the control rod 1 and the hole of the ball member 13b.

In general, engines are normally operated only within an engine speed range up to about 6000 rpm, and therefore it is particularly important to reduce vibrations of the control lever 5 within this speed range. It is also to be noted that the vibration of an engine mainly comprises a vertical component. This vertical component is transmitted to the control rod 1 and the support rod 6 and causes a transverse vibration of a rod in each rod.

In general, the natural frequency fc of a transverse vibration of a rod is related to the length l of the rod. This relationship is expressed by $$fc = \frac{1}{2\pi} \cdot \frac{\pi^2}{l_2} \cdot \sqrt{\frac{EJ}{\rho A}}$$

wherein A is the sectional area of the rod, E its modulus of longitudinal elasticity, p its density, and J its second moment of inertia. This is graphically shown in FIG. 6.

If the lengths of the control rod 1 and the support rod 6 are both determined as being about 680 mm (the length of a single control rod and a single support rod used in the linkage of FIG. 1), then the natural frequencies of the rods 1 and 6 are both about 120 Hz. Accordingly, the vibration of the engine operated within the normal speed range can approach to the natural frequency of the rods with the results of a resonance in both the rods 1 and 6.

Figure 6:
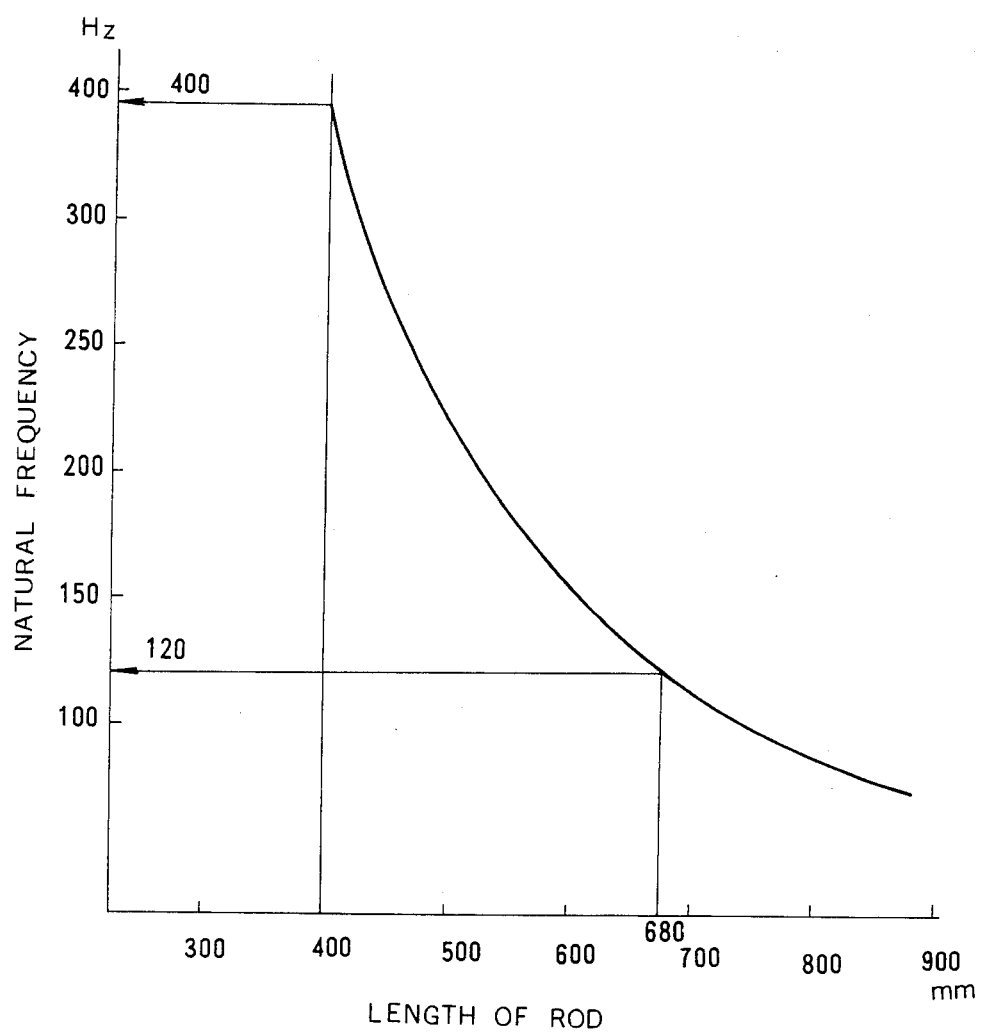
FIG. 6 is a graphical representation showing the relationship between the natural frequency of a rod and the length of the rod.

If, on the other hand, the length of a rod is 400 mm, the natural frequency of this rod is 400 Hz as is evident from the above mentioned equation and FIG. 6. The engine rotational speed corresponding to this frequency, 400 Hz, is much higher than the normal engine speed range. Therefore, a resonance of the rod is prevented within the normal engine speed range, and the vibration of the control lever is reduced.

The control linkage of FIG. 2 is operated as follows:

When the control lever 5 is moved in the select direction, the first part 1a of the control rod 1 rotates about a straight line passing through the center of the spherical bearing 10 and the center of the support portion 13, and the second part 1b of the control rod 1 rotates about its own axis. When the control lever 5 is moved in the shift direction, both of the first part 1a and the second part 1b of the control rod 1 axially move back and forth, and this movement is transmitted to the striking rod 3 for accomplishing a speed change.

A second embodiment is shown in FIG. 3. In this embodiment, the end of the support rod 6 on the transmission side, as well as the opposite end on the control lever side, is connected to the vehicle body, and the second part 1b of the control rod 1 is supported by an arm 12 formed in the support rod 6. A bracket 14 is fixed to the end of the support rod 6 on the transmission side, and this bracket 14 is connected to the vehicle body member 9 through an elastic member 15. In this case, unlike the preceding embodiment, the first part 1a of the control rod 1 rotates about a straight line connecting the joint 11 and the spherical bearing 10 during a select operation of the control lever 5. In other respects, this embodiment is the same as the preceding embodiment.

A third embodiment of the present invention is shown in FIG. 4. In this embodiment, the support rod 6, too, is divided into two parts. A first part 6a of the support rod 6 on the control lever side is connected with a second part 6b on the transmission side by a universal joint 16. A bracket 17 is fixed to the second part 6b of the support rod 6 on the transmission side, and is connected to the vehicle body member 9 through an elastic member 15. In this embodiment, the second part 1b of the control rod 1 is supported by the support portion 13 of the arm 12 integral with the second part 6b of the support rod 6. The end of the second part 6b of the support rod on the transmission side is pivotally connected with the transmission 2 as in the case of the first embodiment.

Figure 5:
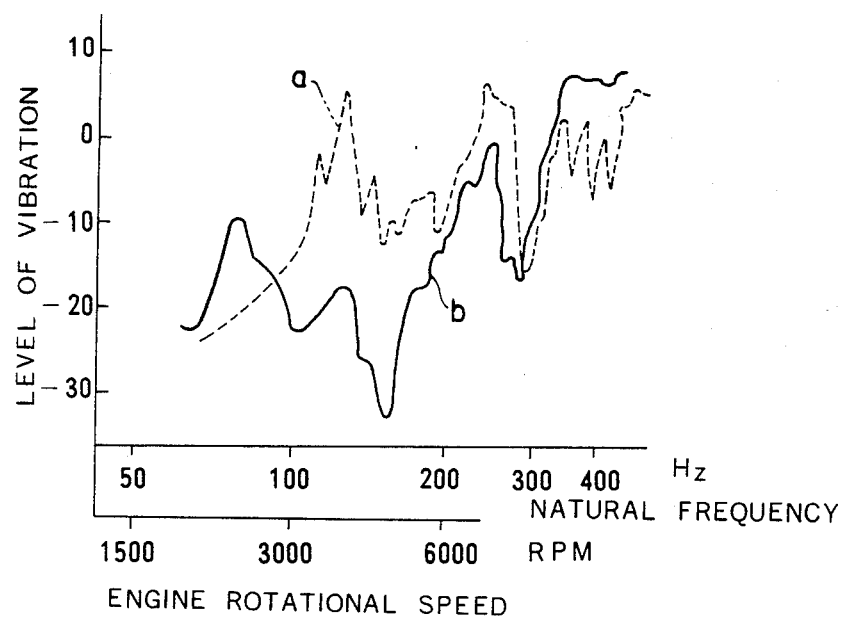
FIG. 5 is a graphical representation showing the results of a vibration experiment.

The results of a experiment on vibration of the control lever 5 of the embodiment of FIG. 4 are shown in FIG. 5. In FIG. 5, a broken line a shows a vibration characteristic in the case of a conventional linkage using a single control rod and a single support rod. A solid line b shows a vibration characteristic in the case of this embodiment. As is evident from FIG. 5, the vibration of the control lever 5 is significantly reduced within the normal engine speed range (up to about 6000 rpm).

What is claimed is:

1. A gear shift control linkage system for a vehicular transmission, comprising:
   manually operable gear shift control lever having upper and lower ends, and a fulcrum intermediate between the upper end and the lower end,
   support means for supporting said control lever, said support means comprising pivot bearing means for allowing said control lever to swing on the fulcrum, and
   a control rod pivotally connected at one end with the lower end of said control lever and pivotally connected at the other end iwth a striking rod of the transmission for transmitting a movement of said control lever to the transmission, said control rod comprising two parts, a first half rod on the control lever side and a second half rod on the transmission side connected together end to end by a joint, said control rod being supported rotatably and axially slidably at an intermediate portion between both ends by an arm formed in said support means.

2. A gear shift control linkage system according to claim 1, wherein said support means comprises a support rod which is connected at a first end with a body of the vehicle, extends substantially in parallel with said control rod, and is connected at a second end with a housing of the transmission, said pivot bearing means being fixed to said support rod.

3. A gear shift control linkage system according to claim 2, wherein said arm of said support means is formed integrally in said support rod, and has at an end slide bearing means which supports rotatably and axially slidably said first half rod on the control lever side.

4. A gear shift control linkage system according to claim 3, wherein the first end of said support rod is fixed to a bracket which is connected to the body of the vehicle through an elastic member, and the second end of said support rod is pivotally connected with the housing of the transmission.

5. A gear shift control linkage system according to claim 1, wherein said support means comprises a support rod which extends substantially in parallel with said control rod and both ends of which are connected to a body of the vehicle, said pivot bearing means being fixed to said support rod.

6. A gear shift control linkage system according to claim 5, wherein said arm of said support means is integral with said support rod, and has at an end slide bearing means which supports rotatably and axially slidably said second half rod on the transmission side.

7. A gear shift control linkage system according to claim 6, wherein one end of said support rod is fixed to a first bracket which is connected to the body of the vehicle through an elastic member, and the other end of said support rod is fixed to a second bracket which is connected to the body of the vehicle through an elastic member.

8. A gear shift control linkage system according to claim 1, wherein said support means comprises a support rod which extends substantially in parallel with said control rod, is fixed to said pivot bearing means and is supported by a body of the vehicle, said support rod comprising two parts, a first half support rod on the control lever side and a second half support rod on the transmission side connected together end to end by a joint.

9. A gear shift control linkage system according to claim 8, wherein one end of said support rod is fixed to a first bracket which is connected to the body of the vehicle through an elastic member, the other end of said support rod is pivotally connected to a housing of the transmission, and an intermediate portion of said support rod is fixed to a second bracket which is connected to the body of the vehicle through an elastic member.

10. A gear shift control linkage system according to claim 9, wherein said arm of said support means is integral with said second half support rod on the transmission side, and has at an end slide bearing means which supports rotatably and axially slidably said second half rod of said control rod on the transmission side.

11. A gear shift control linkage system according to claim 10, wherein said intermediate portion of said support rod fixed to said second bracket is a portion of said second half support rod on the transmission side.

* * * * *